2,937,162

POLYAMIDES OF BICYCLO-(3,3,0)-OCTANE-1,4-DICARBOXYLIC ACID

James C. Martin and John R. Caldwell, Kingsport, Tenn., assignors to Eastman Kodak Company, Rochester, N.Y., a corporation of New Jersey No Drawing. Application June 18, 1958
Serial No. 742,750

15 Claims. (Cl. 260—78)

This invention relates to highly polymeric linear condensation-type polyamides derived from bicyclo-(3.3.0)-octane-1,4-dicarboxylic acid. In addition to the usual process for preparing polyamides there is also provided by this invention an especially efficacious solid phase polymerization process. Particularly valuable polyamides according to this invention can be obtained using the following diamines: 1,6-hexanediamine and its homologs, position isomers of cyclohexanebis(methylamine), 2,6- or 2,5-norcamphane bis(methylamine), position isomers of xylene-α,α'-diamine and chlorinated derivatives thereof. Such polyamides are characterized by having unusually high modulus of elasticity which is important for tire cord, molded bearings and gears, etc.

The common commercial polyamides are 6-nylon and nylon 66. The great importance of high modulus of elasticity especially for tire cord is discussed in prior art such as U.S. Patent 2,130,948. It is also known that high modulus is important in molded objects such as bearings and gears because the resistance to deformation and creep (cold flow) under high loads is improved.

It is an object of this invention to provide highly polymeric linear condensation-type polyamides having improved modulus of elasticity together with melting points above 200° C.

It is another object of this invention to provide such polyamides derived from bicyclo(3.3.0)-octane-1,4-dicarboxylic acid.

It is an additional object of this invention to provide especially efficacious polyamides having a modulus in the range of 55–75 and representing improvements over 6-nylon and nylon 66 having a modulus in the range of 25–40.

It is a further object of this invention to provide a process for preparing novel polyamides using a solid-phase powder buildup technique.

Additional objects will become apparent elsewhere herein.

According to an embodiment of this invention there is provided a highly polymeric linear condensation-type polyamide having an inherent viscosity measured in a mixture of 60% phenol and 40% tetrachlorethane of at least 0.4, melting at above 200° C., and composed of a major proportion of recurring units having the following general formula:

wherein the ends of the polyamide molecules have terminal radicals selected from the group consisting of carboxyl and amino radicals and X represents a divalent organic radical containing from 4 to 20 carbon atoms such that $NH_2-X-NH_2$ is a bifunctional diamine normally capable of forming a linear condensation-type polyamide.

According to a more preferred embodiment of this invention there is provided a polyamide as described in the preceding paragraph having an inherent viscosity of at least 0.5 and melting at above 225° C. wherein X is such that $NH_2-X-NH_2$ is selected from the group consisting of $NH_2-C_nH_{2n}-NH_2$ where $n$ represents an integer of from 4 to 12, position isomers of cyclohexane bis(methylamine), position isomers of xylene-α,α'-diamine, chlorinated position isomers of xylene-α,α'-diamine, $NH_2-C_mH_{2m}-O-C_pH_{2p}-NH_2$, and $$NH_2-C_mH_{2m}-O-C_pH_{2p}-O-C_qH_{2q}-NH_2$$

where $m$, $p$ and $q$ each represents an integer of from 2 to 8.

These novel polyamides are derived from bicyclo-(3.3.0)-octane-1,4-dicarboxylic acid. This acid contains 10 carbon atoms and might be compared to other aliphatic acids such as sebacic acid which contains 10 carbon atoms. The polyamide of the bicyclo dibasic acid used in accordance with this invention condensed with hexamethylenediamine melts in the vicinity of about 250° C. and possesses especially high modulus of elasticity whereas the corresponding polyamide of sebacic acid condensed with hexamethylenediamine melts at only 209° C. and it is not noted for high modulus.

The bicyclo dibasic acid used in accordance with this invention can be prepared according to the method described by Bruson and Reiner in J. Am. Chem. Soc., 67, 728 (1945). They gave the structure of this acid as follows:

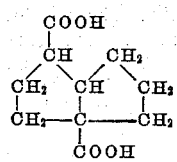

This compounds can be called bicyclo-(3.3.0)-octane-1,4-dicarboxylic acid.

It is presumed that the above structure is correct although the present invention is considered as covering the use of whatever acid is produced by the process described for the preparation of this acid as the oxidation product using fuming nitric acid as described by Bruson and Reiner which product has a melting point in the range of 183–185° C.

The preparation of the novel polyamides covered by this invention can be accomplished by any of the processes well known in the art, several of which are illustrated by the examples given below. All of these processes involve the condensation of the bicyclo dibasic acid used in accordance with this invention and a bifunctional diamine. Many such bifunctional diamines and processes for condensation with bifunctional dicarboxylic acids have been described in the patented prior art as illustrated by Carothers Patents 2,130,523 and 2,130,948.

According to a more limited embodiment of this invention there is provided a process for preparing a highly polymeric linear polyamide melting at above 225° C. comprising (1) heating one mole proportion of bicyclo-(3.3.0)-octane-1,4-dicarboxylic acid with one mole proportion of a diamine selected from the group consisting of 1,6-hexanediamine, m-xylene-α,α'-diamine, p-xylene-α,α'-diamine and 1,4-cyclohexanebis(methylamine) to form a salt, (2) heating said salt in substantially pure form in the presence of from 1 to 20% by weight of water in a closed vessel under autonomous pressure at 210°–260° C. to form a prepolymer melting at above 225° C. and having an inherent viscosity of from about 0.1 to 0.45, (3) heating particles having a size passing through a 20 mesh screen of said prepolymer under a reduced pressure of an inert atmosphere at from 150°–200° C. until there is formed a highly polymeric linear polyamide in the form of particles, said polyamide having an inherent viscosity measured in a mixture of 60% phenol and 40% tetrachlorethane of at least 0.5 (maximum is probably about 2.5).

The solid phase polymerization process just described can be advantageously conducted so that the reduced pressure in step 3 is less than 10 mm. of Hg pressure. The solid phase polymerization can also be advantageously conducted in a fluidized bed maintained in a reaction vessel where an inert gas is used in order to maintain the bed in a fluidized condition. The temperature of the prepolymer particles while they are polymerizing in such a bed can be achieved by heating the walls of the reaction vessel and can be further assisted by heating the gas used to maintain the bed in a fluidized condition. The hot gases can be recycled. By appropriate geometric arrangement of the fluidized bed and related apparatus the process can be adapted for continuous operation.

According to the broader considerations of this invention various classes of diamines can be used. The straight chain aliphatic diamines having the structure $H_2N(CH_2)_nNH_2$ where $n$ is 4–12 are generally suitable. Branched chain aliphatic diamines also can be used as represented by 3-methylhexamethylenediamine, 2-ethylhexamethylenediamine, 2-methyltetramethylenediamine, etc. Amines containing an alicyclic nucleus can be used, as represented by 1,3-diaminocyclohexane, 1,4-diaminocyclohexane, 1,4-cyclohexanebis(methylamine), 1,3-cyclohexanebis(methylamine), 1,2-cyclohexanebis(methylamine), 2,5-norcamphanebis(methylamine), etc. Amines containing an aromatic nucleus can be used, as represented by o-xylene-α,α′-diamine, m-xylene-α,α′-diamine, p-xylene-α,α′-diamine, and chlorinated xylene-α,α′-diamines. Diamines containing ether groups can be used as represented by 3,3′-oxybis(propylamine), $$H_2N(CH_2)_3O\text{—}C_2H_4\text{—}O\text{—}(CH_2)_3NH_2,$$

$O(C_4H_8NH_2)_2$, etc.

These diamines can be used as mixtures and the acid employed in accordance with this invention can be partially replaced with other bifunctional dicarboxylic acids including aromatic, aliphatic and alicyclic types. Examples of such modifying acids include succinic acid, sebacic acid, terephthalic acid, isophthalic acid, dimethylmalonic acid, 2,5-norcamphane dicarboxylic acid, p,p′-sulfonyl dibenzoic acid, diphenic acid, 1,4-cyclohexane dicarboxylic acid, etc. In addition, the polyamides of this invention can be prepared using aminocarboxylic acids as modifiers such as 6-aminohexenoic acid, etc. and the corresponding lactams.

The usual processes for preparing the polyamides include heating the reactants at a temperature of 220–230° C. advantageously under pressure in order to prevent the escape of volatile reactants. The final step of the polymerization reaction can be conducted in the melt phase at atmospheric pressure in an inert atmosphere or under vacuum. Moreover, the polymerization can also be accomplished in an inert solvent such as cresol or xylenol or the like.

The preferred process involving the solid-phase polymerization technique as described above is most especially advantageous in the preparation of polyamides that melt at 250° C. or higher. In the preparation of polyamides that melt higher than 270° C. it is important to use the solid phase process described above in order to attain polyamides having high intrinsic viscosity, good color, and high modulus of elasticity.

This invention can be further illustrated by the following examples of preferred embodiments although it will be understood that these examples are included merely for purposes of illustration and are not intended to limit the scope of the invention unless otherwise specifically indicated.

*Example 1*

To a solution of 6.0 g. (0.03 mole) of bicyclo-(3.3.0)-octane-1.4-dicarboxylic acid in 50 ml. of ethanol was added 4.86 g. (0.031 mole) of 1,6-hexanediamine as a 74% aqueous solution. The resulting solution was stirred rapidly and a white solid precipitated rapidly. This solid was filtered off and recrystallized twice from ethanol-water mixture. The salt had a melting point of 205–210° C. and had the following analysis:

Percent N (theoretical)—8.92; percent N (found)—8.85.

Two g. of this salt together with 5 drops of water was heated in an evacuated, sealed tube at 240° C. for 1 hour. The resulting prepolymer was divided into 2 parts:

A. This was heated for 1½ hours at 240° C. under nitrogen. The resulting polymer had an inherent viscosity of 0.49.

B. This portion was dried in a vacuum oven at 50°–60° C. and then pulverized in a mortar. It was subjected to a solid phase buildup schedule as follows—under vacuum at 150° C. for 15 minutes, 175° C. for 15 minutes, 180° C. for 30 minutes, 200° C. for 3½ hours. The resulting polymer had an inherent viscosity of 0.60 and a melting point of 243–257° C.

The polymer gave strong, elastic, high modulus fibers when spun by the melt method. The polyamide also was useful as a high modulus molding plastic.

*Example 2*

A salt was prepared from bicyclo-(3.3.0)-octane-1,4-dicarboxylic acid and α,α′-m-xylenediamine as described in Example 1. The salt melted at 183–185° C. It was converted to a polyamide as described in Example 1. The polyamide melted at 233–250° C. It gave strong, elastic, high modulus fibers when spun by the melt method. The fibers were of particular value as tire cords because of their high elastic modulus. The polyamide also was useful as a molding plastic.

*Example 3*

A polyamide was prepared by heating one molecular proportion of bicyclo-(3.3.0)-octane-1,4-dicarboxylic acid and one molecular proportion of 1,4-cyclohexanebis(methylamine) in cresol at 210° C. for 2 hours and finally at 230–240° C. for 2 hours. The polymer was isolated by pouring the reaction mixture into acetone.

The polyamide melted at 320–335° C. It was of great value for the manufacture of fibers, films and molded objects where the combination of high modulus, high melting point and excellent high-temperature properties are desired. A particular application is in bearings in equipment subjected to high temperatures.

Especially valuable polyamides of the same type covered by Example 3 can be prepared using the solid phase process described in Example 1. These polyamides can be formed into fibers which have especially high modulus of elasticity and are of great value in making tire cords. Tire cords made from such polyamides have substantially all of the qualities of nylon-66 tire cords together with greater modulus of elasticity. By preparing the polyamide for these tire cords by using the solid phase process the need for the presence of an antioxidant or stabilizer in the polyamide to be spun into the fibers is greatly minimized since the solid phase process produces unusually stable polyamides of this type. The fact that the polyamides of Example 3 melt at 320–325° C. appears to contribute still further to their unusual value as tire cord fibers where the tires are to be subjected to extra heavy duty wear and tear as in military vehicles, aircraft landing wheels, etc.

*Example 4*

A copolyamide was made from 1.0 mole of bicyclo-(3.3.0)-octane-1,4-dicarboxylic acid, 0.6 mole of m- xylene-α,α'-diamine, and 0.4 mole of p-xylene-α,α'-diamine. It softened in the range of 250–265° C. and was valuable as a high modulus molding plastic for gears, bearings, etc.

The invention has been described in detail with particular reference to preferred embodiments thereof, but it will be understood that variations and modifications can be effected within the spirit and scope of the invention as described hereinabove and as defined in the appended claims.

We claim:
1. A highly polymeric linear condensation-type polyamide having an inherent viscosity measured in a mixture of 60% phenol and 40% tetrachlorethane of at least 0.4, melting at above 200° C., of a bifunctional organic dicarboxylic acid comprised of a major proportion of an acid having the following formula:

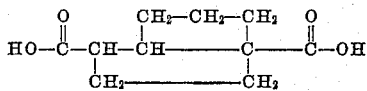

and a bifunctional organic diamine having the formula $NH_2$—X—$NH_2$ wherein X is a divalent organic radical containing from 4 to 20 carbon atoms.

2. A polyamide as defined by claim 1 having an inherent viscosity of at least 0.5 and melting at above 225° C. wherein $NH_2$—X—$NH_2$ is selected from the group consisting of $NH_2$—$C_nH_{2n}$—$NH_2$ where $n$ represents an integer of from 4 to 12, ortho, meta and para position isomers of cyclohexanebis(methylamine), 2,6- and 2,5-norcamphanebis(methylamine), ortho, meta and para position isomers of xylene-α,α'-diamine, chlorinated position isomers of xylene-α,α'-diamine

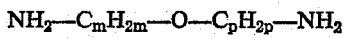
and
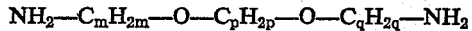

where $m$, $p$ and $q$ each represents an integer of from 2 to 8.

3. A polyamide as defined by claim 2 wherein

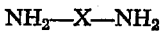

is 1,6-hexanediamine, said polyamide melting at about 240°–260° C.

4. A polyamide as defined by claim 2 wherein

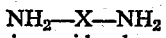

is m-xylene-α,α'-diamine, said polyamide melting at about 230°–250° C.

5. A polyamide as defined by claim 2 wherein

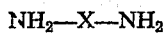

is 1,4-cyclohexanebis(methylamine), said polyamide melting at about 320°–335° C.

6. A polyamide as defined by claim 2 wherein

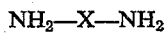

is a combination of 60 percent m-xylene-α,α'-diamine and 40 percent p-xylene-α,α'-diamine, said polyamide melting at about 250°–265° C.

7. A process for preparing a highly polymeric linear polyamide melting at above 225° C. comprising (1) heating one mole proportion of bicyclo-(3.3.0)-octane-1,4-dicarboxylic acid with one mole proportion of a diamine selected from the group consisting of 1,6-hexanediamine, m-xylene-α,α'-diamine, p-xylene-α,α'-diamine and 1,4-cyclohexanebis(methylamine) to form a salt, (2) heating said salt in substantially pure form in the presence of from 1 to 20% by weight of water in a closed vessel under autonomous pressure at 210°–260° C. to form a prepolymer, (3) heating particles of said prepolymer under a reduced pressure of an inert atmosphere at from 150°–200° C. until there is formed a highly polymeric linear polyamide having an inherent viscosity measured in a mixture of 60% phenol and 40% tetrachlorethane of at least 0.5.

8. A process as defined by claim 7 wherein said reduced pressure in step (3) is less than 10 mm. of Hg pressure and substantially all of the prepolymer particles melt at above 225° C. and can be passed through a 20 mesh screen.

9. A process as defined by claim 8 wherein the diamine is 1,6-hexanediamine.

10. A process as defined by claim 8 wherein the diamine is m-xylene-α,α'-diamine.

11. A process as defined by claim 8 wherein the diamine is 1,4-cyclohexanebis(methylamine).

12. A process as defined by claim 8 wherein the diamine is a mixture of 60% m-xylene-α,α'-diamine and 40% p-xylene-α,α'-diamine.

13. A fiber composed of a polyamide defined by claim 1.

14. A fiber composed of a polyamide defined by claim 2.

15. A fiber composed of a polyamide defined by claim 5.

No references cited.

UNITED STATES PATENT OFFICE
CERTIFICATE OF CORRECTION

Patent No. 2,937,162　　　　　　　　　　　　　　　May 17, 1960

James C. Martin et al.

It is hereby certified that error appears in the printed specification of the above numbered patent requiring correction and that the said Letters Patent should read as corrected below.

Column 2, line 39, for "compounds" read -- compound --; column 5, line 32, after "chlorinated" insert -- ortho, meta and para --.

Signed and sealed this 15th day of November 1960.

(SEAL)

Attest:

KARL H. AXLINE
Attesting Officer

ROBERT C. WATSON
Commissioner of Patents